(12) United States Patent
Doroslovac

(10) Patent No.: US 11,787,023 B2
(45) Date of Patent: Oct. 17, 2023

(54) MALE FASTENER EXTRACTOR DEVICE

(71) Applicant: Dragana Doroslovac, Massillon, OH (US)

(72) Inventor: Dragana Doroslovac, Massillon, OH (US)

(*) Notice: Subject to any disclaimer, the term of this patent is extended or adjusted under 35 U.S.C. 154(b) by 295 days.

(21) Appl. No.: 17/196,027

(22) Filed: Mar. 9, 2021

(65) Prior Publication Data

US 2021/0283755 A1 Sep. 16, 2021

Related U.S. Application Data

(60) Provisional application No. 62/987,940, filed on Mar. 11, 2020.

(51) Int. Cl.
| | | |
|---|---|---|
| *B25B 23/10* | (2006.01) | |
| *B25B 15/00* | (2006.01) | |
| *B25B 27/18* | (2006.01) | |
| *B25B 23/00* | (2006.01) | |

(52) U.S. Cl.
CPC .......... *B25B 23/108* (2013.01); *B25B 15/008* (2013.01); *B23B 2251/248* (2013.01); *B25B 15/00* (2013.01); *B25B 23/00* (2013.01); *B25B 27/18* (2013.01)

(58) Field of Classification Search
CPC ..... B25B 27/00; B25B 27/0007; B25B 27/02; B25B 27/14; B25B 27/18; B25B 15/02; B25B 15/04; B25B 15/008; B25B 23/08; B25B 23/0035; B25B 23/103; B25B 23/108; B25B 23/02; B23B 2251/248; B23B 51/08; Y10T 279/15
See application file for complete search history.

(56) References Cited

U.S. PATENT DOCUMENTS

| | | | | |
|---|---|---|---|---|
| 2,622,466 | A | * 12/1952 | Vanden Bos | ......... B25B 23/103 81/53.2 |
| 2,684,606 | A | 7/1954 | Brawley | |
| 3,104,569 | A | 9/1963 | Davis et al. | |
| 7,043,811 | B2 | 5/2006 | Leitao et al. | |
| 2004/0031360 | A1* | 2/2004 | Her | ....................... B25B 15/008 81/436 |
| 2004/0154438 | A1* | 8/2004 | Kozak | ..................... B25B 27/18 81/53.2 |
| 2005/0204542 | A1 | 9/2005 | Pittman | |
| 2018/0354102 | A1* | 12/2018 | Kukucka | ................. B25B 23/08 |
| 2019/0152033 | A1* | 5/2019 | Kukucka | ............... B25B 15/008 |

* cited by examiner

*Primary Examiner* — Robert J Scruggs
(74) *Attorney, Agent, or Firm* — Harpman & Harpman

(57) ABSTRACT

A fastener extractor device for removing fasteners and disengaging the extractor from the so engaged fastener. The extractor includes a threaded main body with a hex drive head end portion and oppositely disposed elongated tool engagement hex body with multiple bracing sidewalls with independent contoured fastener engagement channels for fastener insertion and continued rotational removal. A tubular hex surface extractor nut is threadably disposed on the main body member for reversed thread rotation advancement to physically disengage the tool engagement body from the removed fastener.

5 Claims, 5 Drawing Sheets

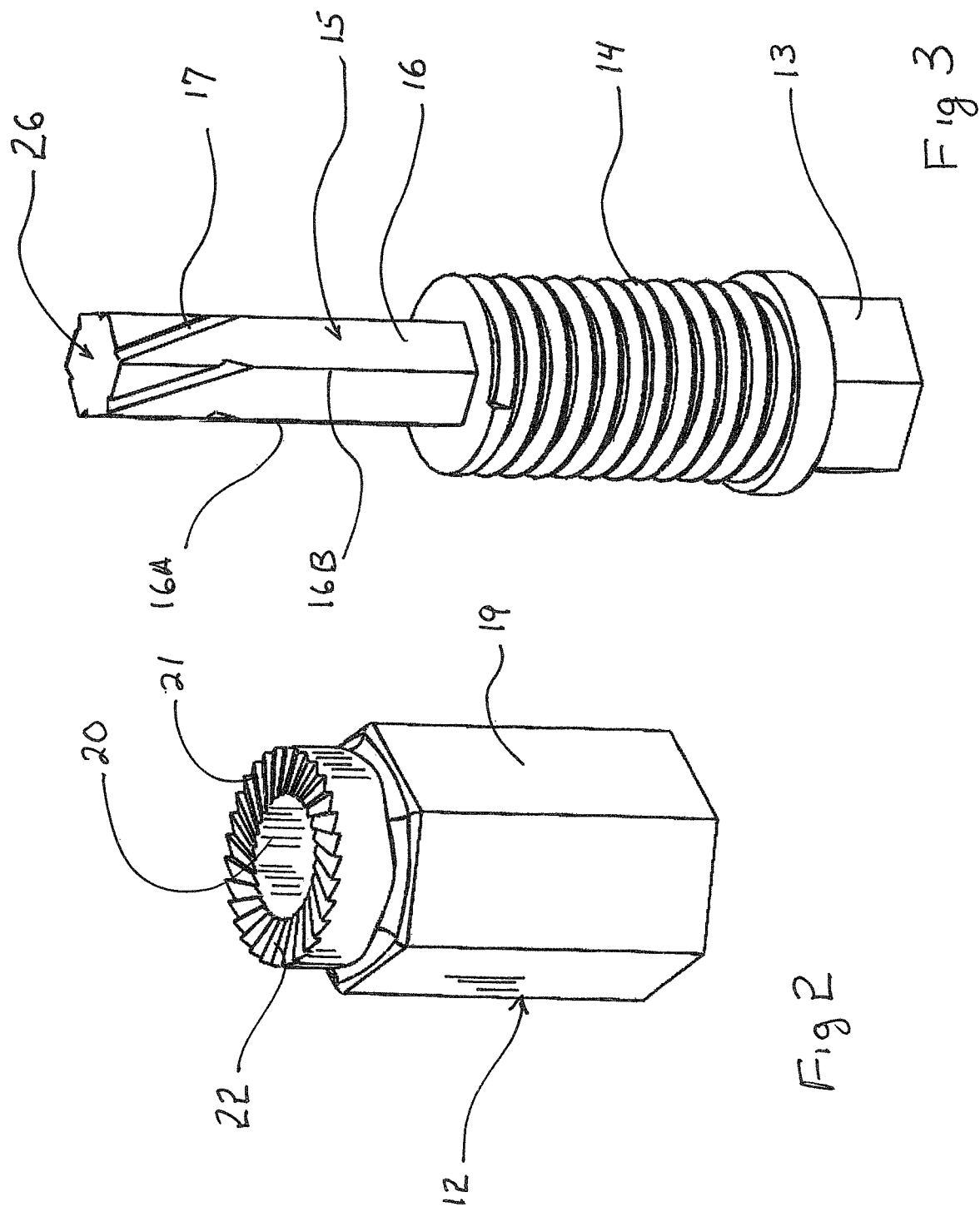

MALE FASTENER EXTRACTOR DEVICE

This application claims the benefit of U.S. Provisional Application No. 62/987,940, filed Mar. 11, 2020.

BACKGROUND OF THE INVENTION

1. Technical Field

This invention relates to fastener extractors for use with broken or damaged fasteners for removing the fastener. More specifically, the present invention discloses an anti-slip thread extractor to rotatably gauge and remove damaged fasteners.

2. Description of Prior Art

Prior art fastener extractors have been developed that apply to a variety of different configurations, see for example U.S. Pat. Nos. 2,684,606, 3,104,569, 7,043,811, U.S. Publications 2004/01876464, 2005/0204542 and 2019/0152033.

In U.S. Pat. No. 2,684,606 a combination self-threading easy out and lock nut is disclosed having a straight self-threading tab threaded into the bolt stud secured by tightening a lock nut allowing threaded removal of the stud.

In U.S. Pat. No. 3,104,569 a stud bolt remover is disclosed, the remover has a tubular member that threadably engaged on the stud bolt, a nut threaded onto the member forces the tubular member into frictional gripping contact with the stud bold for rotational removal.

U.S. Pat. No. 7,043,811 discloses a method of removing studs, the method utilizes welding an extractor to the tack weld attaching a puller to the extracted weld to the tack weld and removing the key ring portion by pulling on the puller.

U.S. Publication 2004/0187646 described a stud installation and stud removal tool set including a pair of body members which are mounted on the stud to be removed and tightened against one another so that one of the body members may rotate to an effective removal of the stud.

U.S. Publication 2005/0204542 describes a cylinder head stud removal tool, the apparatus comprises a series of replaceable steady pilots and corresponding rotary tools in pairs for milling pilot for flatter concave milling of the end of the broken stud, the drill bit and cooperating drill bit for drilling the end of the broken stud and a tap cooperating threaded into the tap pilot to form new threads to accept a replacement stud.

U.S. Publication 2019/0152033 discloses a fastener extractor device for removing fasteners, the extractor device has a shank body, a drive head and a torque tool body and tubular sleeve and an external threaded and internal thread. The shank body is driven into the fastener and rotation of the shank body by the drive head removes the fastener and upon counter clockwise rotation of the tubular sleeve it engages and extracts the fastener from the extractor device.

SUMMARY OF THE INVENTION

An integrated two stage fastener extractor tool that provides for damage fastener engagement by multiple contoured hex supported engagement channels that bite into the fastener and upon rotation remove it. A reverse threaded displacement sleeve provides for disengaging the removed fastener from the extractor tool by enhanced directional surface engagement.

DESCRIPTION OF THE DRAWINGS

FIG. 2 is an enlarged perspective view of the shoulder nut extractor sleeve of the extractor tool.

FIG. 3 is an enlarged perspective view of the shank body of the extractor.

DETAILED DESCRIPTION OF THE INVENTION

Figure 1:
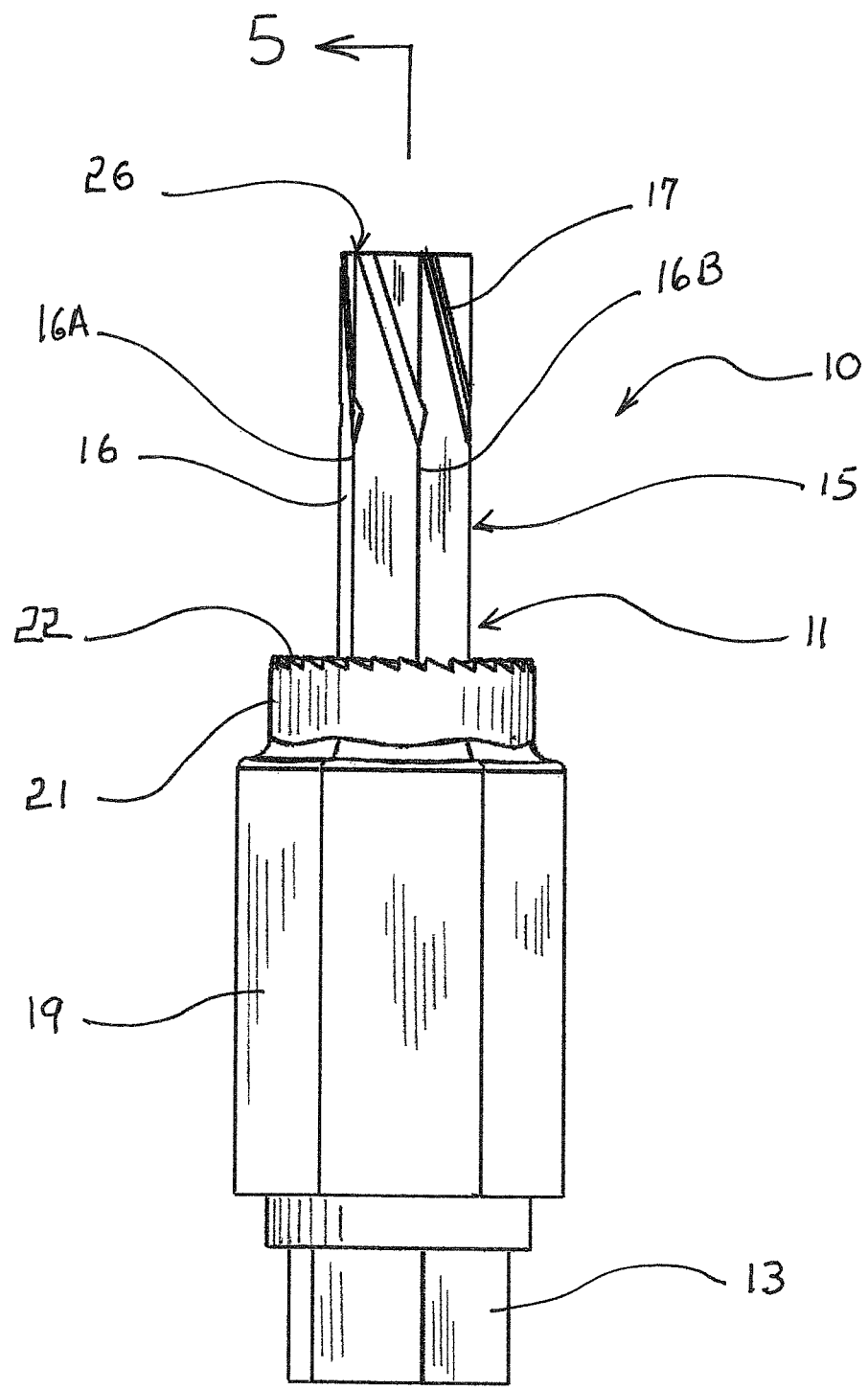
FIG. 1 is an enlarged front elevational view of the fastener extractor tool of the invention.

Referring to FIGS. 1-7 of the drawings, a fastener extractor 10 of the invention can be seen having a shank bit body member 11 with fastener release shoulder nut fitting 12 threadably disposed thereon. The shank bit body member 11, best seen in FIG. 3 of the drawings has a hex drive head 13 with an external left-handed thread portion 14 extending longitudinally with a hex shank fastener socket engagement portion 15 extending integrally therefrom. The hex shank fastener engagement portion 15 is characterized by a plurality of elongated flat interengaging fastener engagement surfaces 16 of equal transverse and longitudinal dimension so as defined a hex tool bit configuration known in the art.

Figure 4:
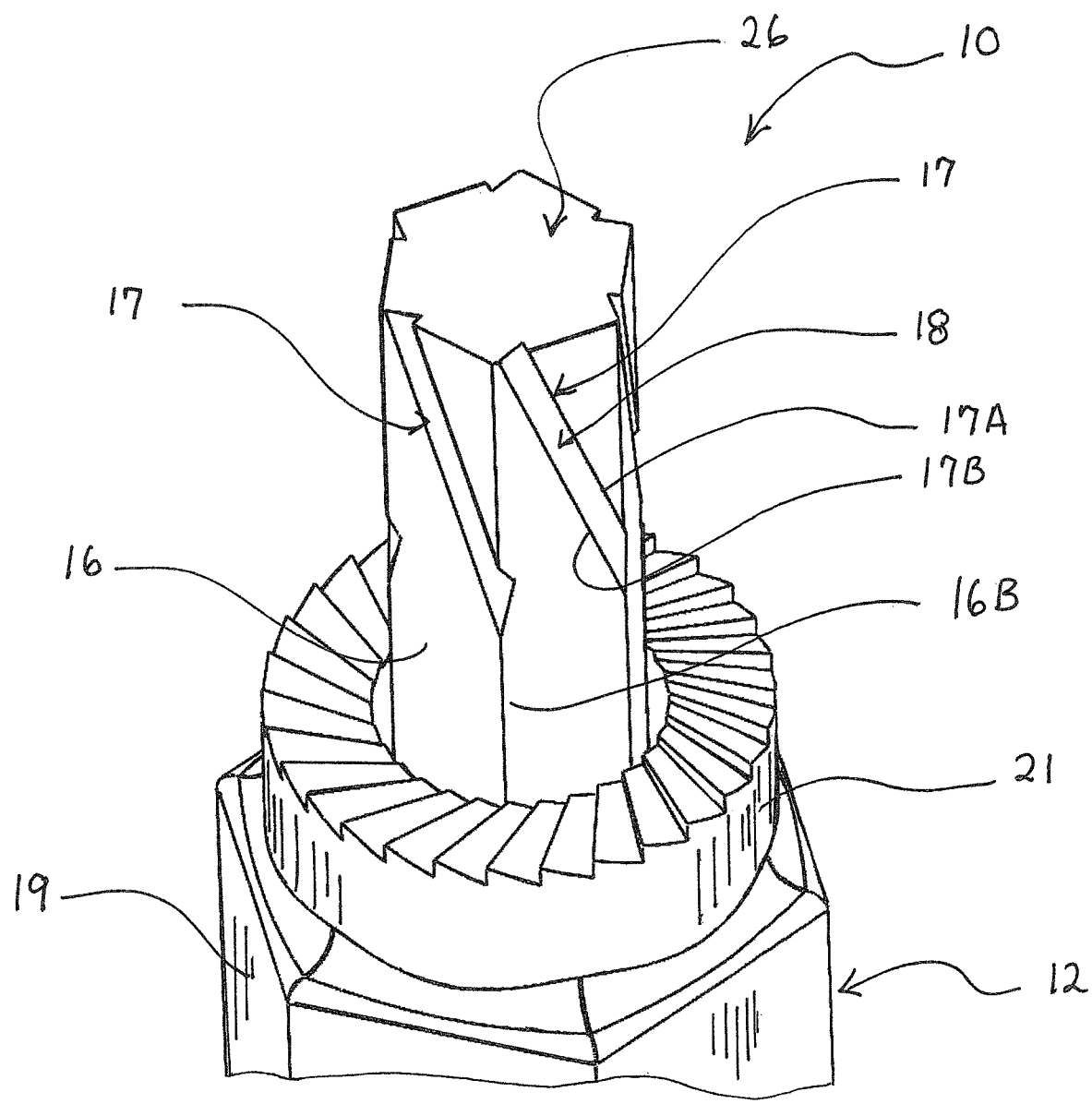
FIG. 4 is an enlarged partial front and top view of the fastener extractor tool.
Figure 6:
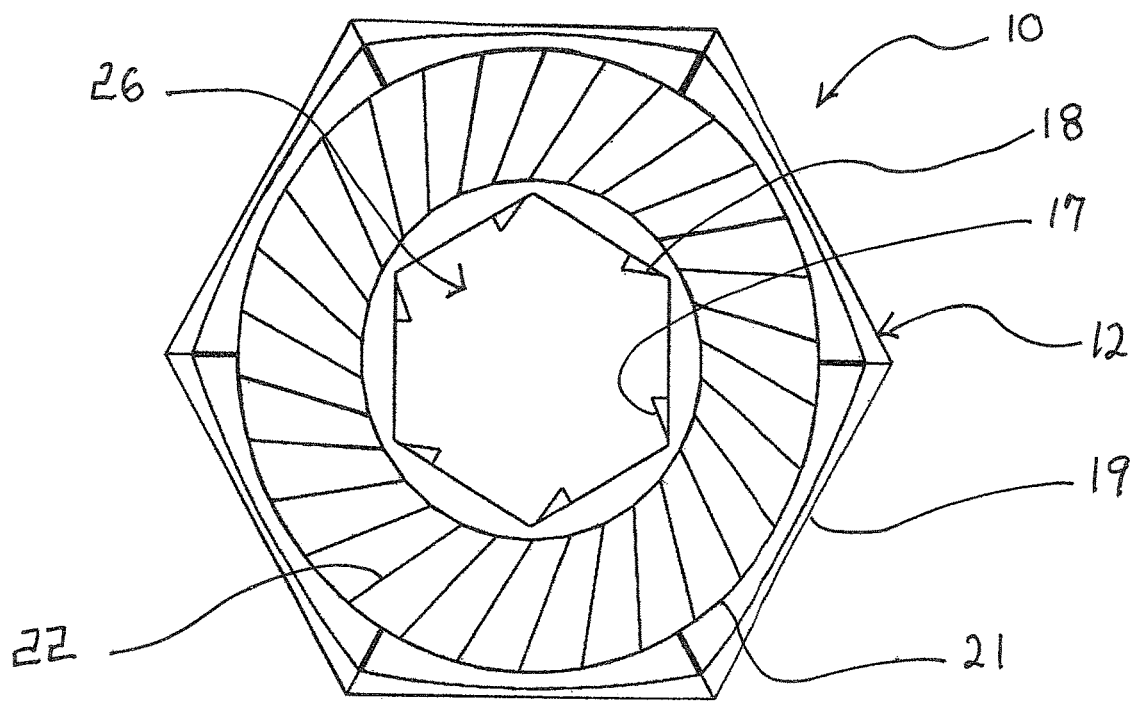
FIG. 6 is an enlarged top plan view of the fastener extractor tool.
Figure 7:
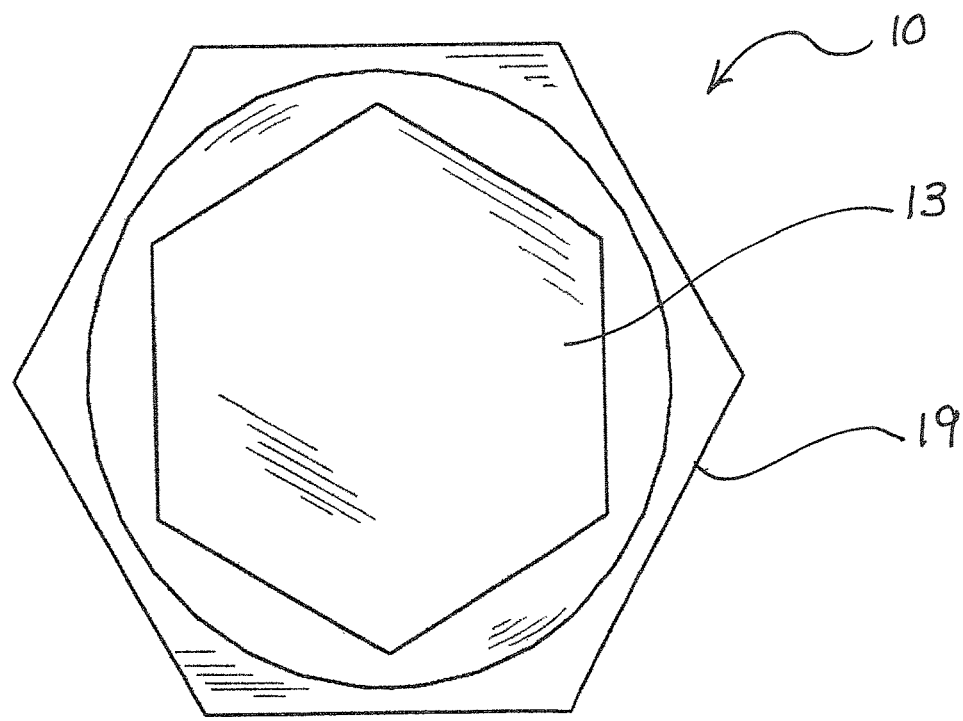
FIG. 7 is a large bottom plan view of the extractor tool.

The fastener engagement socket is therefore hexagonal with radially positioned fastener engagement surface 16 about its longitudinal axis. The hexagonal shank is of a length which by necessity varies with the size of the shank. A unidirectional angular channel 17 is formed in each of the respective flat fastener engagement surfaces 16 as best seen in FIG. 4 of the drawings. Each of the unidirectional channels 17 are of a descending angular orientation with a contoured transverse tapered interior surface 18 defining a pair of spaced parallel elongated fastener engagement lateral edges 17A and 17B. The angular orientation of each channel 17 extends transversely across the flat engagement surface 16 from the lateral edge 16A end to the corresponding second lateral edge 16B in spaced vertical relation thereto and are sequentially formed about the multiple hex flat engagement surfaces as best seen in FIGS. 4 and 6 of the drawings.

Figure 5:
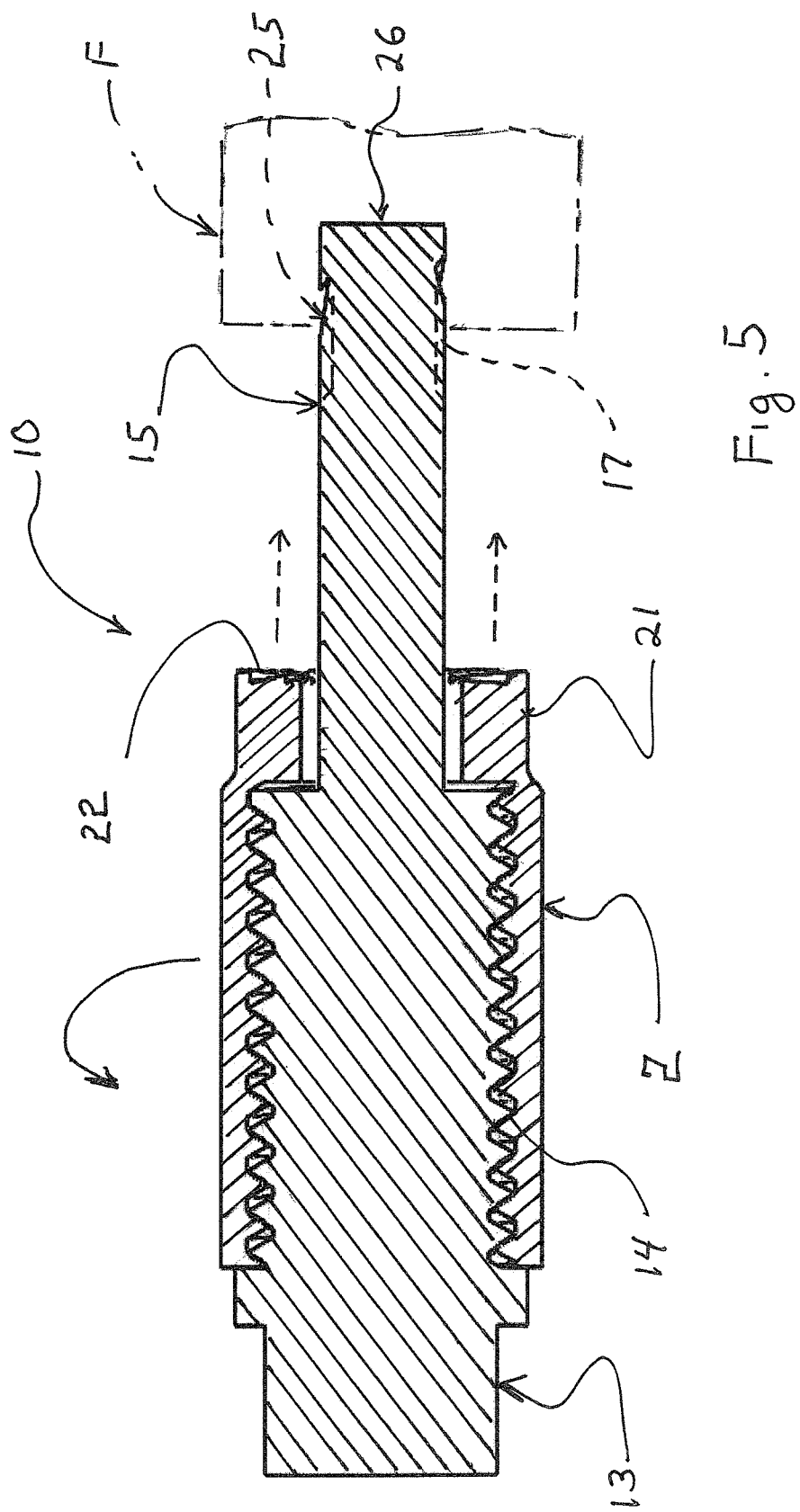
FIG. 5 is an enlarged sectional view on lines 5-5 of FIG. 1.

It will be seen as used initially the extractor 10 is driven into a prepared damaged fastener F, seen in FIG. 5 of the drawings in broken lines, and that each of the respective engagement channels 17 will be selectively engaged with the fastener F. When counter clockwise rotational force is applied to the hex head end 13 by a driver, not shown, as indicated by directional arrows FA, the respective channels 17 lateral edges 17A and 17B will correspondingly dig into the fastener interior surface defining multiple gripping points there along the length of each channel thereby affording rotational removal of the damaged fastener F.

Referring now to FIGS. 1, 2, 4 and 5 of the drawings, a fastener release shoulder nut 12 can be seen having an elongated tubular structure with an internal diameter complimentary to the exterior threaded exterior diameter of the shank bit body 13. The fastener release shoulder nut 12 is thereby internally threaded for left hand threaded engagement on the external threaded portion 14 of the shank bit body member 11 during use.

The fastener release shoulder nut 12 has an exterior hex surface 19, for a driver engagement, not shown, with an end opening at 20 of reduced diameter so as to be fitted over the hex shank fastener engagement portion 15 as illustrated in FIGS. 1 and 5 of the drawings.

The reduced annular diameter of the flat end surface nut 21 is configured with a plurality of contoured unidirectional serrations 22, as best seen in FIGS. 4 and 6 of the drawings.

It will be seen that the left-hand threaded 14 engagement on the shank bit body 11 will advance the fasteners release shoulder nut 12 over the hexagonal shank fastener engagement portion 15 by the counter clockwise shoulder nut 12 rotation for direct engagement with the remote removed fastener F within the tool indicated in broken lines in FIG. 5 of the drawings.

As the rotation continues, the unidirectional serrations 22 impinge on the fasteners F, a bi-directional lateral and rotational force is imparted in the opposite direction of the engagement channel 17 thereby effectively removing the fastener F from the fastener extraction tool 10. The sequential steps for removing a broken or damaged fastener F are as follows:

The compromised fastener is prepared for removal by drilling indicated by engagement bore 25 therein. The shoulder nut 12 is threadably fitted as hereinbefore described over the hexagonal shank fastener engagement portion 15 and is positioned at its furthest point from the engagement channel 17 enabled shank portion free end 26. The fastener extractor 10 is then aligned and tapped into the fastener's prepared bore 25 achieving equilateral contact in the bore 25's length and diameter. This effectively assures faster grip within and eliminates the forced expansion to the fastener's thread material. It will therefore be seen that the hereinbefore described angular orientation of the multiple engagement channel 17 within the respective pool's flat engagement surfaces 16 provide an enhanced sure grip and acts as a removal screw upon rotation via the hex drive end 13 drawing the hexagonal shaft 15 of the tool into the fastener F and thereby upon continued rotation rotates the fastener F for selective threaded removal.

Once the fastener F is removed, the shoulder nut 12 is advanced by its left-hand threaded engagement on the shank portion 11 and engages its unidirectional serrations 22 against the securely held fastener and thereby effectively provides counter rotation and the longitudinal force to remove the fastener F from the fastener extractor 10.

It will be seen that this combination of the multiple angular oriented channel induced lateral edge fastener engagement surfaces 17A and 17B provide for enhanced rotational torque and removal of the fastener F. It will be evident that the left-hand threaded shoulder nut 12 having the unidirectional serration surface 22 will upon advancement and engagement with the fastener provide counter-axial rotational lateral force to remove the engaged fastener from the extraction tool 10 thus presents and provides a new and novel improved fastener extractor configuration taking the advantage of applied bi-directional extraction and removal methodology.

It will thus be seen that a new and novel fastener extractor 10 of the invention has been illustrated and described and it will be apparent to those skilled in the art that various changes and modifications may be made therein without departing from the spirit of the invention.

Therefore I claim:

1. A fastener extractor device comprising,
   a shank bit body having a drive head end and oppositely disposed fastener socket engagement portion having a free end,
   a plurality of flat fastener engagement surfaces about said fastener engagement portion defining lateral edges there between,
   at least one contoured fastener engagement channel extending angularly across from one respective flat surface's lateral edge to another flat surface lateral edges at least one of said flat fastener engagement surfaces,
   said fastener engagement channel having first and second spaced parallel lateral fastener engagement edges extending between said respective flat surface lateral edges,
   an external left-hand thread extending between said fastener socket engagement portion and said drive head end,
   a threaded shoulder nut fitting being laterally engaged on the exterior left hand thread portion of the shank bit body with an open-end surface having a plurality of unidirectional abutting serrations for removed fastener engagement and release from said fastener extractor device upon rotation thereof.

2. The fastener extractor device set forth in claim 1 wherein said shoulder nut fitting has a hex external drive engagement surface and an annular end surface portion of reduced annular dimension about said open end surface, said unidirectional serrations on said end surfaces.

3. The fastener extractor device set forth in claim 1 wherein said external left-hand thread on said shank body is of a longitudinal length equal to that of said internal thread shank nut portion for longitudinal advancement by counter clockwise rotation thereof.

4. The fastener extractor device set forth in claim 1 wherein said fastener engagement channel extends from said respective flat fastener lateral edges as defined by elongated junctions of said adjacent flat fastener engagement surfaces.

5. The fastener extractor device set forth in claim 1 wherein said fastener engagement channel has a transverse tapered interior surfaces of unequal transverse dimension defining a V-shaped configuration.

* * * * *